United States Patent [19]

Sato et al.

[11] Patent Number: 4,734,323
[45] Date of Patent: Mar. 29, 1988

[54] VIBRATION DAMPING SOUNDPROOF SHEETS FOR USE IN VEHICLES

[75] Inventors: Junichi Sato, Kawana; Tomoyoshi Yamada, Toyohashi; Junichiro Naito, Toyokawa; Kunihisa Shigenobu, Nagoya; Kouichi Sato, Aichi, all of Japan

[73] Assignee: Toyoda Gosei Co., Ltd., Nishikasugai, Japan

[21] Appl. No.: 36,865

[22] Filed: Apr. 9, 1987

[30] Foreign Application Priority Data

| Apr. 22, 1986 | [JP] | Japan | 61-92964 |
| Apr. 22, 1986 | [JP] | Japan | 61-92965 |
| Apr. 25, 1986 | [JP] | Japan | 61-97186 |

[51] Int. Cl.$^4$ .................. F16F 15/00; E04B 1/82; B32B 3/26; B32B 25/00
[52] U.S. Cl. .................. 428/317.3; 181/208; 181/288; 181/294; 428/317.7; 428/319.1; 428/319.7; 428/519
[58] Field of Search .......... 181/208, 288, 294; 428/317.1, 317.3, 317.7, 319.1, 319.3, 319.7, 319.9

[56] References Cited

U.S. PATENT DOCUMENTS

| 4,397,906 | 8/1983 | Nakagawa et al. | 428/317.7 |
| 4,495,240 | 1/1985 | McCarthy | 428/489 |
| 4,528,241 | 7/1985 | Uffner et al. | 428/489 |
| 4,537,921 | 8/1985 | Uffner et al. | 428/489 |
| 4,654,257 | 3/1987 | Murachi | 428/317.1 |
| 4,663,224 | 5/1987 | Tabata et al. | 428/317.7 |
| 4,668,565 | 5/1987 | Murachi | 428/317.3 |

FOREIGN PATENT DOCUMENTS

| 53-71174 | 6/1978 | Japan | 428/319.7 |
| 54-106586 | 8/1979 | Japan | 428/489 |

*Primary Examiner*—William J. Van Balen
*Attorney, Agent, or Firm*—Cushman, Darby & Cushman

[57] ABSTRACT

This invention is directed to a vibration damping soundproof sheet for use in vehicles, in which the surface of the soundproof layer is made flat irrespective of the or uneven configuration at the surface of a vehicle. The soundproof layer-forming material comprises a formed rubber blend in which a foaming agent and other rubber blending agents are blended with a rubber type polymer in which the soundproof layer-forming material contains from 15 to 85% by weight of 1,2-polybutadiene ingredient.

13 Claims, 8 Drawing Figures

VIBRATION DAMPING SOUNDPROOF SHEETS FOR USE IN VEHICLES

BACKGROUND OF THE INVENTION

This invention concerns a vibration damping soundproof sheet used for forming a vibratio damping soundproof structure comprising a vibration damping layer secured to the panel surface of a vehicle (particularly, floor surface) and a sound proof layer formed on the vibration damping layer.

As shown in FIG. 1, the vibration damping soundproof structure as described above comprises a vibration damping layer 2 prepared from a sheet-like vibration damping layer-forming material made of rubber type adhesive blend by setting the sheet to the floor surface of a vehicle and then heating to soften the material during passage through a drying furnace or the like thereby fitting to the floor surface of a vehicle (vehicle panel) 1, and a soundproof layer 3 made of a soundproof layer-forming material made of felt (of poor fitness) by cutting patching the material on the vibration damping layer 2. A mat layer-forming material (usually lined carpet) is bonded on the soundproof layer 3 to form a mat layer 5. The felt materials used herein are those prepared from natural fibers, synthetic fibers, regenerated fibers, etc impregnated with synthetic resin such as phenol resin or vinyl acetate resin into a plate-like configuration.

However, the vibration damping soundproof structure as described above involves the following problems:

(1) Since the vibration damping layer and the soundproof layer are formed by different steps respectively and the soundproof layer is formed by patching work, the number of working steps is increased as a whole.

(2) Since the felt material is applied by patching, the structure partially includes those portions not formed with the soundproof layer as illustrated in the drawing failing to provide satisfactory soundproofing effect.

In order to overcome the foregoing problems, the present inventors have already proposed a vibration damping soundproof sheet for use in vehicles comprising a vibration damping layer-forming material made of a rubber type adhesive blend and a soundproof layer forming-material made of a foamed rubber blend appended and laminated to each other.

The vibration damping soundproof sheet is applied by setting the material on the panel surface of a vehicle and passing through a drying furnace (usually at a heating temperature from 40° to 160° C.). Then, as shown in FIG. 2, the damping layer-forming material 7 is heated to soften and fitted to the panel surface 1 of the vehicle by its own weight as shown in FIG. 3 and the soundproof layer-forming material 8 is foamed and they constitute a vibration damping layer 12 and a soundproof layer 13 respectively.

Although the foregoing problems can be solved by the vibration damping soundproof sheet, if there is unevenness on the panel surface 1 of the vehicle, the soundproof layer-forming material 8 together with the vibration damping layer-forming material 7 are fitted along the configuration of the vehicle panel surface as shown in FIG. 3 to form an uneven shape to the surface of the soundproof layer 13. However, this is not desirable in view of the increasing users' demand for making the floor surface flat in recent years.

Further, since the porous soundproof layer 13 is formed to the inside of the chamber of the vehicle, there is an additional problem that the soundproofing effect can not be obtained effectively for these sounds coming from the outsides that should be obtained by pores of the porous soundproof layer 13, that is, attenuation of air vibrations and conversion into heat energy for acoustic waves from a sound source (sounds coming out of the vehicle) due to the resistance at the circumferential walls of the pores when the waves intrude therein.

Accordingly, although it is desired to increase the thickness of the porous soundproof layer in order to improve the sound-barrier property, it is undesirable resulting in increase in the weight and the material cost (refer to Comparative Example in Table 6).

SUMMARY OF THE INVENTION

The object of this invention is to render the surface of a soundproof layer irrespective of the uneven configuration of a panel surface of a vehicle thereby satisfying users' demand in a vibration damping soundproof sheet for use in vehicles comprising a vibration damping layer-forming material made of a rubber type adhesive blend and a soundproof layer-forming material made of a foamed rubber blend appended and laminated to each other, by making the soundproof layer-forming material somewhat fluidized by heating and thereby fitting the same to the panel surface of the vehicle upon application.

The foregoing object can be attained in a soundproof layer-forming material comprising a foamed rubber blend in which from 15 to 85% by weight of 1,2-polybutadiene and the balance of the rubber component are blended.

Another object of this invention is to improve the soundproofing performance of a vibration damping soundproof sheet for use in vehicles and this object can be attained by laminating a resonance absorbing plate layer to the soundproof layer, the surface of which is made flat by blending the soundproof layer forming material as described above.

DESCRIPTION OF THE PREFERRED EMBODIMENT

Figure 1:
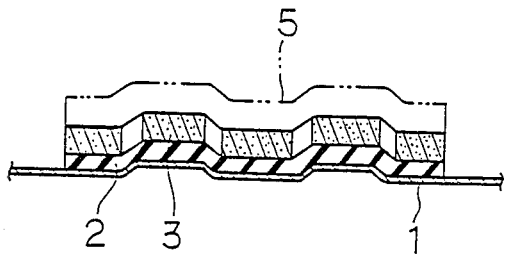
FIG. 1 is a schematic cross sectional view for a conventional vibration damping soundproof structure for a vehicle.

Explanation will be made to a vibration damping soundproof sheet for use in vehicles according to this invention while referring to the drawings.

Figure 2:
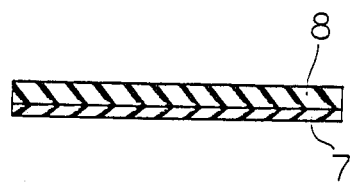
FIG. 2 is a cross sectional view for a vibration damping soundproof sheet for use in vehicles illustrating the first embodiment (Examples 1-4) of this invention and the initial concept of the present invention.
Figure 3:
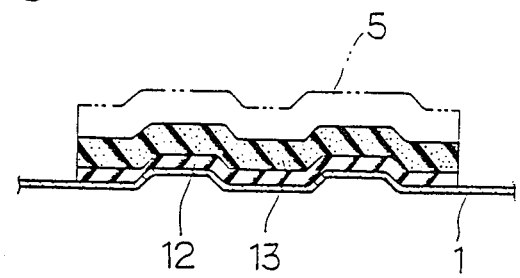
FIG. 3 is a cross sectional view illustrating the way of applying the vibration damping soundproof sheet for use in vehicles as the initial concept of this invention.

(I) Vibration Damping Soundproof Sheet for Use in Vehicles Shown in FIG. 2

The vibration damping soundproof sheet for use in vehicles comprises a vibration damping layer-forming material 7 made of a rubber type adhesive blend and a soundproof layer-forming material 8 made of a foamed rubber blend which are appended and laminated with each other. The polymer of the foamed rubber blend comprises from 15 to 85% by weight of 1,2-polybutadiene and the balance of the rubber component.

Each of the above-mentioned constitutions will now be described in details, in which and "parts" used as the blending units are on the weight basis unless otherwise specified.

(a) Rubber type adhesive blend is prepared by blending thermosetting resin, tackifier, inorganic filler, fibrous filler, and further, softening agent to a matrix composed of various type rubber ingredients and bitumens and then kneading them in a kneader and, followed by extrusion molding. The matrix comprises from 10 to 90 wt % of the rubber ingredient and from 90 to 10 wt % of the bituminous ingredient. If the rubber ingredient is less than 10 parts, the vibration damping performance is remarkably degraded at a high temperature range and excess heat fluidization is caused in the heat treatment resulting in heat sagging. Further, if the bitumen ingredient is less than 10 parts, heat fluidization becomes insufficient in the heat treatment thereby often causing a problem in view of the fitness to the uneven configuration of the floor surface of a vehicle in the drying step.

(1) The rubber ingredient usable herein can include, for example, NR (natural rubber), NBR (nitrile rubber), IIR (butyl rubber), EPDM (ethylene - propylene terpolymer), EPM (ethylene - propylene copolymer), SBT (styrene-butadiene rubber) and CR (chloroprene rubber) or the regenerated rubber therefrom either alone or in mixture of two or more of them.

(2) The bituminous ingredient used herein can include, for example, straight asphalt, blown asphalt and like other natural asphalt either alone in admixture of two or more of them.

(3) For the thermosetting resin, those resins cocrosslinkable with the rubber ingredient (1) as described above can be used in an amount from 10 to 100 parts by weight on the matrix 100 parts by weight so as to maintain a desired vibration damping property even at a high temperature region. The addition of the thermosetting resin can provide a great vibration damping performance with a small amount of the inorganic fillers and also provide excellent workability such as kneading property and moldability to the vibration damping layer-forming material.

If the amount of the thermosetting resin is less than 10 parts, no improvement for the vibration damping performance can be attained through the entire range of low temperature to high temperature. While on the other hand, if it exceeds 100 parts, desired vibration damping performance can no more be obtained since the thermosetting resin constitutes a matrix phase, in which the glass transition point of the material for giving the vibration damping performance is shifted to a higher temperature side than the usual working circumstantial temperature (0°–80° C.) at the surface of a vehicle or the like.

The thermosetting resin can include, for example, unsaturated polyester resin, silicone resin, phenol resin, diallyphthalate resin, melamine resin and epoxy resin.

In the case of using NR, SBR, EPDM, EPM, BR, fluoro rubber, silicone rubber, urethane rubber, etc as the rubber ingredient, unsaturated polyester resin, silicone resin, diallylphthalate resin, epoxy-acrylate resin or the like in combination with an organic peroxide as a curing agent is selected.

Further, in the case of using IIR, NBR, CR, etc. as the rubber ingredient, phenol resin in admixture with hexamethylene tetramine is selected for instance.

(4) The tackifier usable herein is selected from petroleum type hedrocarbon resin (aromatic, aliphatic and terpenic resin), cumarone type resin (for example, cumarone-indene resin), natural resin (for example, rosin and rosin derivatives) and phenol-terpene type resin either alone or in admixture of two or more of them. The blending amount is usually from 10 to 100 parts by weight based on the matrix as 100 parts by weight described above. The blending amount varies depending on the setting for the peak temperature in the vibration damping effect, the softening point of the tackifier and kind of the glass transition point, and the blending amount is usually increased if it is desired to shift the peak toward the higher temperature.

(5) The inorganic filler usable herein is selected from calcium carbonate, graphite, mica, talc, alumina white, silica, aluminum sulfate, barium sulfate, calcium sulfate, molybdenum disulfide and carbon black, either alone or in admixture of two or more them. The blending amount is from 30 to 500 parts by weight, preferably, 150 to 350 parts by weight based on the matrix 100 parts by weight. If it is less than 30 parts by weight, no sufficient damping effect can be obtained, whereas if it exceeds 500 parts by weight, undesired effect will be given to the workability such as kneading and distribution. Further, flanky inorganic filler such as graphite and mica are effective for improvement of the vibration damping effect. Preferred fiberous fillers (6) can include, glass fibers, asbestos, polyester fibers and nylon fibers.

The softening agent (7) usable herein is selected from process oil (paraffinic, naphthenic and aromatic type), phthalic acid ester (for example, dioctyl phthalate), aliphathc acid esters (for example, dioctyl adipate, dioctyl sebacate), high molecular weight esters (for example, polyester plasticizer), epoxidized fatty acid (for example, epoxidized soybean oil), phosphoric acid ester (for example, tricresyl phosphate), either alone or in admixture of two or more of them. The blending amount is usually from 0 to 150 parts by weight based on the matrix 100 parts by weight as described above. The softening agent is added for improving the workability such as kneading and distributing property, if the peak temperature in the vibration damping effect is set for a higher temperature side, lower blending amount is desirable.

(b) Foamed rubber blend is prepared by adding and kneading usual rubber blends such as carbon black, zinc powder, inorganic filler, softener, tackifier, vulcanizer and vulcanization promotor and further, foaming agent to the polymer.

(1) The polymer used herein comprises from 15 to 85% by weight of 1,2-polybutadiene and the balnce of the rubber ingradient as described above. If the amount of 1,2-polybutadiene is less than 15% by weight, flowing property upon application (heat foaming) is poor thereby failing to obtain a desired surface flatness. If the amount of 1,2-polybutadiene exceeds 85% by weight, the viscosity of the blend becomes lower, degasing is caused failing to obtain highly foamed product and the flowing property becomes excessive upon working (heat foaming) and the surface flatness is rather degraded. Further, 1,2-polybutadiene used herein has the vinyl bond content of greater than 70%, degree of crystallinity of greater than 5% and the intrinsic viscosity ($\eta$) (at 30° C. in toluene) of greater than 0.5 dl/g.

As the rubber ingredient, NR, IR, BR, SBR and EODM, etc. having preferable compatibility with 1,2-polybutadiene is desired.

The foaming agent (2) may be inorganic agent such as sodium bicarbonate and ammonium carbonate, but an organic agent is employed usually such as dinitrosopentamethylene tetramine, azodicarbon amide, p-toluene sulfonyl hydrazide, azobisisobutyronitrile, 4,4'-oxybisbenzene sulfonyl hydrazine. The blending amount is from 3 to 30 parts by weight on the matrix 100 parts by weight such that the foaming ration of the matrix is from 2 to 10 times. Combined use of a foaming aid is desirable depending on the kind of the foaming agent.

(3) For carbon black inorganic filler, softening agent, tackifier, vulcanizer, vulcanization promotor, etc, those customarily employed are used in a each in a usual amount.

(c) Preparation of Vibration Damping Soundproof Sheet

The blends (a) and (b) described above are usually kneaded in a kneader, Banbury mixer or the like distributed or extruded from a roll into the sheet-like vibration damping layer-forming material (usually of 0.2-5 mm thickness) 7 and the soundproof layer-forming material (usually of 1 to 5 mm thickness) 8 and both of them are appended and laminatee with each other to constitute a vibration damping soundproof sheet according to this invention (refer to FIG. 2). The bonding operation is carried out by forming them separately into elongate materials, cutting both of them each into a predetermined size and then laminating them, or carried out simultaneously upon roll distribution or extrusion.

(d) Fabrication of Vibration Damping Soundproof Sheet

Figure 4:
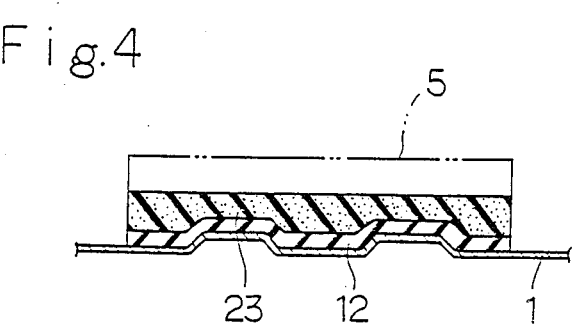
FIG. 4 is a cross sectioal view illustrating the way of applying the vibration damping soundproof sheet for use in vehicles in one embodiment (Examples 1-4) of this invention)

The thus obtained vibration damping soundproof sheet is set to the panel surface of a vehicle and passed through a drying furnace (usually at a heating temperature from 140° to 160°). Then, the vibration damping layer-forming material 7 is heated to soften and fitted by its own weight to the panel surface 2 of the vehicle, while the soundproof layer-forming material 8 is foamed to form a vibration damping layer 12 and a soundproof layer 23 respectively (refer to FIG. 4). A mat layer 5 is formed on the upper surface of the soundproof layer 23 as usual.

Upon foaming, the soundproof layer-forming material 8 develops some flowing property to make the surface of the soundproof layer 23 flat as shown in the drawing irrespective of the uneven configuration of the panel surface 1 of the vehicle. Then, the thus formed soundproof layer has a higher continuity of forms (open cell property) and more improved soundproofing performance as compared with the case of using a conventional foamed rubber blend in which the rubber type polymer is merely composed of the rubber ingredient.

It may be considered that the use of ethylene-vinyl acetate copolymer (EVA) instead of 1,2-polybutadiene in this invention will provide similar effects, although it has not yet been confirmed.

EXAMPLE

The rubber type adhesive blend shown below kneaded in a kneader was extruded to a thickness of 1 mm to obtain a vibration damping layer-forming material. Further, a foamed rubber blend in which the rubber type polymer in the following basic blending as shown in Table 1 was kneaded in a kneader and distributed to a predetermined thickness so as to obtain 10 mm thickness after the foaming to obtain a soundproof layer-forming material. The thus obtained vibration damping layer forming material and the soundproof layer-forming material are bonded in the combination as shown in Table 3 to constitute vibration damping soundproof sheet of each of the Examples and the test was conducted for each of the following items. The test results are shown in Table 1.

| (1) Rubber type adhesive blend A (unit:part) | |
|---|---|
| SBR | 100 |
| Straight asphalt (60–80) | 70 |
| Aromatic hydrocarbon resin I (softening point 80°) | 50 |
| Aromatic hydrocarbon resin II (softening point 100°) | 30 |
| Process oil | 30 |
| Mica | 100 |
| Calcium carbonate | 200 |
| (2) Rubber type adhesive blend B (unit:part) | |
| Regenerated SBR | 50 |
| Straight asphalt (60–80) | 50 |
| Cumarone resin | 20 |
| DOP | 10 |
| Calcium bicarbonate | 150 |
| Mica | 30 |
| Clay | 20 |
| Unsaturated polyester resin | 50 |
| Dialkylperoxide | 2 |
| (3) Foamed rubber type blend (unit:part) | |
| Rubber type polymer | 100 |
| Zinc powder | 5 |
| Stearic acid | 2 |
| Calcium carbonate | 150 |
| Process oil | 50 |
| Carbon black | 20 |
| Sulfur | 1.5 |
| Vulcanization accelerator | 2.5 |
| Foaming agent | 10 |
| Foaing aid | 10 |

(4) Test Items (1) Foaming ratio of the soundproof layer: Not-foamed sheet is placed on released paper and heated to foam in a thermostable bath at 150° C. for 30 minutes. The foaming ratio was determined from the variation coefficient for the thickness before and after the foaming.

(2) Specific gravity of soundproof layer: According to water-replacement method.

(3) Water absorption rate of soundproof layer (evaluation for the foam continuity): Not-foamed sheet of 20 mm×20 mm heated to foam under the condition of 150° C.×30 minutes was immersed in water at 40° C. for one hour at a reduced pressure of 130 mmHg and, theresfter, the absorption rate was determined by the variation coefficient of the weight.

(4) Sound barrier property: A vibration damping soundproof sheet was set on an iron plate (240 mm × 150 mm × 0.8 mm thickness) and applied with heat treatment under the condition of 150° C. × 30 minutes. The sound-barrier property was tested for the thus obtained specimen.

Specifically, the specimen was attached to an opening at the boundary between a sound receiving chamber and a sound source chamber and test soundwaves are constantly generated from a a laud speaker in the sound source chamber. Under this condition, the sound pressure levels in the sound source chamber and the sound receiving chamber were measured respectively by way of a microphone by a ⅓ octave analyzer and the performance was determined as the difference of the sound pressure levels between both of the chambers.

(5) Vibration damping property: The vibration damping property was judged for the specimen obtained in the same procedures as in the sound barrier test by means of a loss coefficient calculated from the result of measurement by the damping method in 25° C. atmosphere.

(6) Fitness—surface flatness: Vibration damping soundproof sheets (each of about 700 m × 400 mm) in examples and comparative examples were set to a corrugated iron plate (corrugated configuration: R15 mm, depth 15 mm) and applied with heat treatment under the conditions of 150° C. × 30 minutes. The fitness and the surface flatness were judged with naked eyes respectively. o—good, x—failed.

forming material 15 and a retaining layer-forming material 16 in FIG. 2.

(a) The adhesive layer-forming material 15 comprises a matrix comprising of various kinds of rubber ingredients (a-1) and bituminous ingredient (a-2) and, blended therewith, thermosetting resin (a-3), tackifier (a-4), inorganic filler (a-5), fiberous filler (a-6) and softening agent (a-7), which were kneaded in a kneader followed by extrusion molding.

As the rubber ingredient (a-1), NR, NBR, IIR, EPDM, EPM, SBR, CR and like other rubber or the regenerated rubber therefrom is used either alone or in admixture of two or more of them.

As the bituminous ingredient (a-2), straight asphalt, blown asphalt and like other natural asphalt is used, either alone or in admixture of two or more of them.

As the thermosetting resin (a-3), those co-crosslinkable with the rubber ingredient (a-1) described above are used. The thermosetting resin can include, for example, unsaturated polyester resin, silicone resin, phenol resin, diallylphthalate resin, melamine resin and epoxy resin.

In the case of using NR, SBR, EPDM. EPM, BR, fluorine rubber, silicone rubber and urethane rubber, etc. for the rubber ingredient, unsaturated polyester resin, silicone resin, diallylphthalate resin, epoxy acrylate resin, etc. in combination with an organic peroxide as the hardening agent is selected.

In the case of using IIR, NBR, CR, etc. as the rubber ingredient, phenol resin in admixture with hexamethylene tetramine is selected for example.

TABLE

|  | Comparative Example | | Example | | | | Comparative Example |
| --- | --- | --- | --- | --- | --- | --- | --- |
|  | 1 | 2 | 1 | 2 | 3 | 4 | 3 |
| Rubber type polymer of foamed rubber blend (PB/NR)* | 0 | 10 | 20 | 50 | 80 | 50 | 90 |
|  | 100 | 90 | 80 | 50 | 20 | 50 | 10 |
| vibration damping layer-forming material | A | A | A | A | A | B | A |
| Physical property of Soundproof layer |  |  |  |  |  |  |  |
| Foaming ratio | 1.4 | 1.8 | 4.5 | 6 | 4.5 | 6 | 2 |
| Specific gravity | 0.5 | 0.46 | 0.19 | 0.17 | 0.20 | 0.17 | 0.40 |
| Water absorption (%) | 30 | 50 | 150 | 290 | 200 | 290 | 80 |
| Physical property of vibration damping soundproof sheet |  |  |  |  |  |  |  |
| Sound proofness (dB) |  |  |  |  |  |  |  |
| 500 Hz | 26 | 30 | 30 | 30 | 29 | 31 | 29 |
| 1 KHz | 37 | 40 | 49 | 52 | 50 | 53 | 43 |
| 2 KHz | 40 | 43 | 54 | 59 | 56 | 58 | 47 |
| 4 KHz | 59 | 63 | 68 | 70 | 71 | 69 | 66 |
| Vibration damping property | 0.20 | 0.20 | 0.21 | 0.26 | 0.22 | 0.29 | 0.2 |
| Fitness |  |  |  |  |  |  |  |
| Surface fitness | X | X |  |  |  |  | X |

*PB/NR = 1,2-polybutadiene/natural rubber

From the test results shown in Table 1, it can be seen that the vibration damping soundproof sheet in each of the examples has a favorable surface flatness, as well as higher open cell property judging from the water absorption rate as compared with each of the comparative examples and, accordingly, also has favorable sound proofness over each of the Examples with low open cell property.

Figure 5:
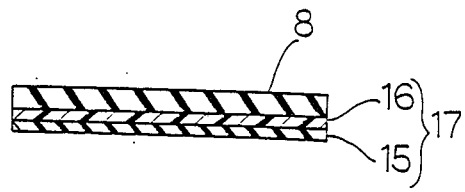
FIG. 5 is a cross sectional view for a vibration damping soundproof sheet for use in vehicles as another embodiment (Examples 5-12) of this invention.

(II) Vibration Damping Soundproof Sheet for Use in Vehicles Shown in FIG. 5

The vibration damping soundproof for use in vehicles comprises a structure in which the vibration damping layer-forming material 17 is made of an adhesive layer- Blending of such a thermosetting resin can improve the vibration damping peroramnce of the adhesive layer at a high temperature region.

As the tackifier (a-4), there can be used petroleum carbon resin (aromatic, aliphatic, terpenic), cumarone type resin (for example, cumarone-indene resin), natural resin (for example, rosin and rosin derivatives) and phenol-terpene type resin, either alone or in admixture of two or more of them.

As the inorganic filler (a-5), those selected from potassium carbonate, graphite, mica, talc, alumina white, silica, aluminum sulfate, barium sulfate, calcium sulfate, molybdenum disulfide, carbon black, etc. are used either alone or in admixture of two or more of them.

As the fiberous filler (a-6), glass fiber, asbestos, polyester fiber, nylon fiber, etc. are used.

As the softening agent, those selected from process oil (paraffinic, naphthenic and aromatic), phthalic acid ester (for example, dioctyl phthalate), aliphatic acid esters (for example, dioctyl adipate and dioctyl sebacate), high molecular weight ester (for example, polyester plasticizer), epoxidized fatty acid (for example, epoxidized soybean oil), phosphoric acid ester (for example, tricresyl phosphate) are used either alone or in admixture of two or more of them.

(b) The retaining layer-forming material 16 is prepared from a matrix comprising (b-1) a semi-hardened state thermoplastic resin and (b-2) further in combination with bituminous ingredient, (b-3) rubber ingredient incorporated with a thermosetting resin ingredient capable of co-crosslinking therewith, as well as (b-4) a matrix comprising the above-mentioned ingredient (b-3) incorporated with bituminous ingredient and, properly blending therewith, tackifier, inorganic filler, fiberous filler and, further, a softening agent.

(b-1) The following thermosetting resin can be used as the matrix:

. Unsaturated polyester resin, silicone resin, phenol resin, diallylphthalate resin, melamine resin, epoxy reisn, urea resin, etc which are co-crosslinkable with the rubber ingredient of the adhesive layer-forming material 15. These resins are semi-hardened to constitute the retainer layer-forming material 16. The semi-hardened state means such that the resin shows no adhesive property at a normal temperature, but is softened or fluidized at the initial stage of the heat treatment and then hardened to form a substantially rigid material.

(b-2) A matrix comprising the semi-hardened state thermosetting resin ingredient and the bituminous ingredient can be used.

The thermosetting resin ingredient is exemplified above as (b-1). AS the bituminous ingredient those exemplified as above as the bitunimous ingredient (a-1) of the adhesive layer-forming layer 15 (a) described above, that is, straight asphalt, semi-blown asphalt, blown asphalt and like other natural asphalt are used either alone or in an admixture of two or more of them.

The tackifier (a-4), inorganic filler (a-5) and fiberous filler (a-6) described above for the adhesive layer-forming material (a) can be incorporated desirably into the matrix (b-1), (b-2) mainly composed of the semi-hardened thermosetting resin.

There are no particular restrictions for the lamination of the retainer layer forming material 16 to the adhesive layer-forming material 15, and not-hardened powdery thermosetting resin is scattered or not-hardened liquid thermosetting resin is coated so as to provide a dry film thickness of about 0.05 to 5 mm.

(b-3) A matrix comprising a rubber ingredient and a thermosetting resin ingredient capable of co-crosslinking therewith can be used. For example, those comprising a rubber ingredient such as NR, EPDM, EPM and SBR and a thermosetting resin ingredient such as unsautrated polyester resin, silicon resin, diallylphthalate resin and epoxy resin can be used. In this case, an organic peroxide is used together as the hardening agent. The rubber material and the thermosetting resin can be crosslinked with the rubber ingredient of the adhesive layer-forming material.

Further, those comprising a rubber ingredient such as IIR, NBR and CR and a thermosetting resin ingredient such as phenol resin can be used for instance. In this case, hexamethylene tetramine or the like is used together as the hardening agent.

(b-4) A matrix comprising the rubber ingredient (b-4), a thermosetting resin ingredient and the bituminous ingredient capable of co-crosslinking with the rubber ingredient can be used. Those as described in (b-3) above is used for the rubber ingredient and the thermosetting resin ingredient. Those as described in (b-2) above is used as the bituminous ingredient.

It is desirable to properly incorporate the tackifier (a-4), inorganic filler (a-5), fiberous filler (a-6) and softening agent (a-7) as has been described for the adhesive layer forming material (a) above to the matrix of using the rubber ingredient.

The retainer layer-forming material 16 using the rubber ingredient is prepared by kneading the materials as described above in a kneader or the like, extruding or calendering into a sheet-like configuration and then integrating onto the adhesive layer-forming material 15 (a) as described above by using a press roll or the like. Increased thickness is desirable for the retainer layer 21 and it is usually from 0.05 to 10 mm and, preferably, from 0.2 to 5 mm.

(c) The soundproof layer-forming material 18 is the same foamed rubber blend as that for the soundproof layer forming material 8 in the vibration damping soundproof sheet for use in vehicle illustrated in FIG. 2.

(d) Preparation of Vibration Damping Soundproof Sheet

A vibration damping layer-forming material 17 comprising a retainer layer-forming material 16 formed on an adhesive layer forming material 15 each in a sheet-like configuration are appended and laminated with a soundproof layer-forming material 8 to constitute a vibration damping soundproof sheet shown in FIG. 5:

The bonding operation is conducted by preparing the vibration damping layer forming material 17 and the soundproof layer forming material 8 separately as elongate material cutting both of them into a predetermined size and then laminating them, or conducted simultaneously upon roll distribution or extrusion.

(e) Application of Vibration Damping Soundproof Sheet

The vibration damping soundproof sheet thus obtained is set to the panel surface of a vehicle and passed through the inside of a drying furnace (heating temperature usually at 140°-160° C.). Then, the vibration damping layer-forming material is heated to soften, fitted by its own weight to the panel surface of the vehicle and then fused. In this case, the thermosetting resin of the retaining layer-forming material 16 is crosslinked to harden into rigid material by the heat of the heat treatment to form a retainer layer 11. While on the other hand, the adhesive layer-forming material 15 forms an adhesive layer 20. The vibration damping layer 22 of a dual layer structure comprising the retainer layer 21 and the adhesive layer 20 generally provides an excellent vibration damping performance in a broad temperature region as compared with the vibration damping layer of a mono-layered structure.

Figure 6:
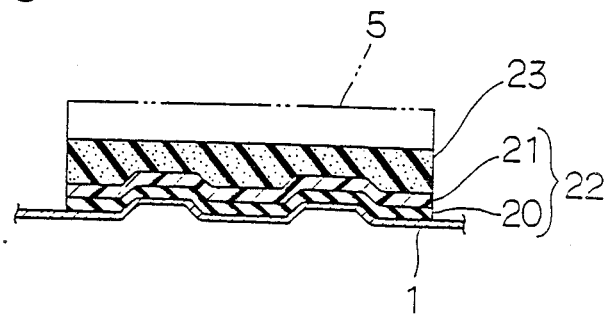
FIG. 6 is a cross sectional view illustrating the way of applying the vibration damping soundproof sheet for use in vehicles shown in FIG. 5.

Further, the soundproof layer-forming material 8 is foamed into a soundproof layer 23 (refer to FIG. 6). A mat layer 5 is formed to the upper surface of the soundproof layer 23.

Upon foaming, the soundproof layer forming material 8 develops a slight flowing property to render the surface of the soundproof layer 23 flat as shown in the illustrated embodiment irrespective of the uneven configuration at the panel surface 1 of the vehicle.

EXAMPLE (1) After kneading the rubber blends of the compositions shown in the following Table 2 (indicated by parts by weight) in a kneader, sheet-like products of 1 mm thickness were extrusion molded to obtain each of adhesive layer-forming materials.

(2) Thermosetting resin blends of the compositions shown in Table 3 were coated to the upper surface of the adhesive layer-forming material to a dry film thickness of 1 mm to obtain vibration damping layer-forming materials (a, b, c).

Further, the vibration damping layer-forming materials (d, e, f) were obtained by kneading the blends as shown in Table 3 in a kneader and then extrusion molding the sheetlike products of 1 mm thickness.

TABLE 2

| Composition | Adhesive layer-forming material | |
|---|---|---|
| | I | II |
| Straight asphalt (60–80/100) | 50 | 50 |
| Regenerated SBR | 50 | 50 |
| Cumarone resin | 20 | 20 |
| DOP | 10 | 10 |
| Heavy calcium carbonate | 150 | 150 |
| Mica | 30 | 30 |
| Clay | 20 | 20 |
| Unsaturated polyester resin | | 50 |
| Dialkylperoxide | | 2 |

TABLE 3

(unit:parts by weight)

| Composition | Retainer layer-forming material | | | | |
|---|---|---|---|---|---|
| | a | b | c | d | e |
| Unsaturated polyester | 100 | | | 100 | 50 |
| Dialkylperoxide | 4 | | | 4 | 2 |
| Epoxy resin | | 100 | 100 | | |
| Hexahydrophthalic acid anhydride hardening agent | | 80 | 80 | | |

TABLE 3-continued (unit:parts by weight)

| Composition | Retainer layer-forming material | | | | |
|---|---|---|---|---|---|
| | a | b | c | d | e |
| Accelerator | | 2 | 2 | | |
| Straight asphalt (60–80) | | 100 | | | 50 |
| Regenerated SBR | | | | 100 | 50 |
| Cumarone resin | | | | 20 | 20 |
| DOP | | | | 10 | 10 |
| Heavy calcium cardonate | | | | 150 | 150 |
| Mica | 10 | | | 30 | 30 |
| Clay | | | | 20 | 20 |
| Asbesto | 50 | | | | |

(3) Further, foamed rubber blends in the same basic blends as the vibration damping soundproof sheet shown in FIG. 2 using the rubber polymers as shown in Table 4 were kneaded in a kneader and calendared to a predetermined thickness such that the thickness after the foaming was 10 mm to obtain soundproof layer-forming material.

(4) The thus obtained vibration damping layer-forming material and the soundproof layer-forming material were appended by the combinations shown in Table 4 to form vibration damping soundproof sheets for each of the examples and test was conducted for each of the following items.

Comparative Examples 7 and 8 are vibration damping soundproof sheets using only the adhesive layer forming material 1 as described above as the vibration damping layer-forming material, and the thickness for each of the vibration damping layers was 2 mm in Comparative Example 7 and 5 mm in Comparative Example 8.

TEST ITEMS

The test items are sound-barrier property (4), vibration damping property (5), fitness and the surface flatness (6), which are the same tests as for the vibration damping soundproof sheet for use in vechile of FIG. 2 as described above.

Results for each of the test are shown in Table 4.

TABLE 4

| | Comparative Example 4 | Comparative Example 5 | Example 5 | Example 6 | Example 7 | Comparative Example 6 | Example 8 |
|---|---|---|---|---|---|---|---|
| Rubber type polyler of foamed rubber blend (PB/NR)* | 0/100 | 10/90 | 20/80 | 50/50 | 80/20 | 90/10 | 50/50 |
| Vibration damping layer | | | | | | | |
| Retainer layer | a | a | a | a | a | a | a |
| Adhesive layer | I | I | I | I | I | I | II |
| Physical property of vibration damping soundproof sheet | | | | | | | |
| Sound-barrier property (dB) | | | | | | | |
| 500 Hz | 26 | 30 | 30 | 30 | 30 | 29 | 30 |
| 1 Hz | 38 | 41 | 50 | 53 | 51 | 44 | 53 |
| 2 Hz | 41 | 44 | 55 | 60 | 57 | 48 | 61 |
| 4 KK | 60 | 64 | 69 | 70 | 71 | 66 | 71 |
| Vibration damping property | | | | | | | |
| 0° C. | | 0.22 | 0.23 | 0.24 | 0.24 | 0.21 | 0.24 |
| 20° C. | | 0.28 | 0.29 | 0.30 | 0.34 | 0.31 | 0.27 | 0.34 |
| 40° C. | | 0.32 | 0.33 | 0.34 | 0.37 | 0.34 | 0.33 | 0.36 |
| 60° C. | | 0.32 | 0.32 | 0.33 | 0.38 | 0.34 | 0.32 | 0.38 |
| 80° C. | | 0.28 | 0.28 | 0.29 | 0.30 | 0.29 | 0.28 | 0.33 |
| 100° C. | | 0.19 | 0.19 | 0.20 | 0.24 | 0.21 | 0.18 | 0.20 |
| 120° C. | | 0.15 | 0.15 | 0.16 | 0.17 | 0.17 | 0.14 | 0.00 |
| Fitness | | | | | | | |
| Surface flatness | X | X | | | | X | |

| | Example 9 | Example 10 | Example 11 | Example 12 | Comparative Example 7 | Comparative Example 8 |
|---|---|---|---|---|---|---|
| Rubber type polyler of foamed rubber blend (PB/NR)* | 50/50 | 50/50 | 50/50 | 50/50 | 50/50 | 50/50 |
| Vibration damping layer | | | | | | |
| Retainer layer | b | c | d | e | I | I |

TABLE 4-continued

| Adhesive layer | I | I | I | I | thickness | |
| --- | --- | --- | --- | --- | --- | --- |
| | | | | | :2 mm | :5 mm |
| Sound-barrier property (dB) | | | | | | |
| 500 Hz | 30 | 30 | 31 | 31 | 30 | 33 |
| 1 Hz | 53 | 52 | 53 | 53 | 52 | 55 |
| 2 Hz | 59 | 60 | 59 | 59 | 59 | 63 |
| 4 KK | 71 | 70 | 70 | 69 | 70 | 73 |
| Vibration damping property | | | | | | |
| 0° C. | 0.21 | 0.23 | 0.27 | 0.25 | 0.15 | 0.16 |
| 20° C. | 0.30 | 0.30 | 0.33 | 0.31 | 0.26 | 0.27 |
| 40° C. | 0.31 | 0.29 | 0.34 | 0.31 | 0.08 | 0.10 |
| 60° C. | 0.32 | 0.28 | 0.26 | 0.27 | 0.06 | 0.08 |
| 80° C. | 0.29 | 0.19 | 0.17 | 0.18 | 0.03 | 0.04 |
| 100° C. | 0.18 | 0.10 | 0.09 | 0.10 | 0.02 | 0.04 |
| 120° C. | 0.10 | 0.04 | 0.05 | 0.07 | 0.01 | 0.02 |
| Fitness | | | | | | |
| Surface flatness | | | | | | 0.01 |

From the result of the test shown in Table 4, it can be seen that the vibration damping soundproof sheets of the respective examples have favorable surface flatness as compared with those in Comparative Examples 4-6.

Further, the vibration damping soundproof sheets for the respective examples have excellent vibration damping performance (particularly, at higher temperature range) over those in Comparative Examples 7 and 8.

Figure 7:
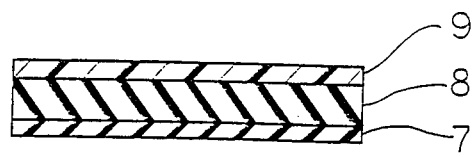
FIG. 7 is a cross sectional view for a vibration damping soundproof sheet for use in vehicles as another embodiment (Examples 13-18) of this invention.

(III) Vibration Damping Soundproof Sheet for Use in Vehicle Shown in FIG. 7

The vibration damping soundproof sheet for use in vehicle has a constitution, shown in FIG. 2 wherein a resonance absorption plate layer-forming material (9) is laminated on a soundproof layer-forming material 8.

(a) The same vibration damping layer-forming material 7 as the vibration damping soundproof sheet for use in vehicle shown in FIG. 2 can be used. Further, it can also be made into a 2-layered structure as the vibration damping soundproof sheet for use in vehicle shown in FIG. 5.

(b) The same vibration damping soundproof sheet for use in vehicle as shown in FIG. 2 is used as the soundproof layer-forming material 8.

The soundproof layer-forming material 8, so long as it has an open cell structure after applying the vibration damping soundproof sheet for use in vehicle, can provide the same soundproofing effect as that of the vibration damping soundproof sheet for use in vehicle shown in FIG. 7. However, if the surface of the soundproof layer is not rendered flat, it is necessary to render the sheet flat as a whole by applying a resonance absorption plate layer.

Figure 8:
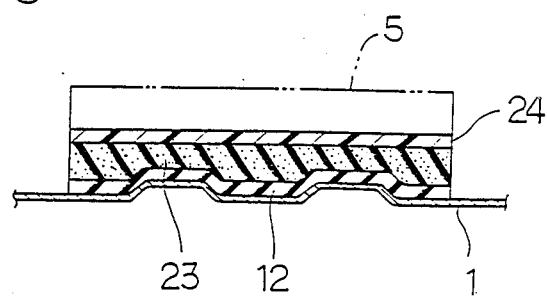
FIG. 8 is a cross sectional view illustrating the way of applying the vibration damping soundproof sheet for use in vehicles shown in the FIG. 7.

(c) There is no particular restriction to the forming material 9 for the resonance absorption plate layer in view of the material, provided that it forms a plate-like product (resonance absorption plate layer 24) as shown in FIG. 8 after the application as described in (e) below, which puts the porous soundproof layer 23 between it and the vibration damping layer 12 to constitute a typical sound absorbing plate structure of: "plate-porous layer-plate".

For instance, the vibration damping layer-forming material 7 as described in (a) above can be applied as it is as the resonance absorption plate layer-forming material 9. In addition, various kind of synthetic resins such as vinyl chloride resin, EVA, PMMA, PE, PP and vinyl acetate resin, as well as various kind of elastomers can be used.

Further, in the case of using a specific foamed rubber blend containing 1,2-polybutadiene as the soundproof layer-forming material 8, since the upper surface of the porous soundproof layer 23 (the surface in adjacent with the resonance absorption plate layer) is made flat, plate material (such as made of metal, synthetic resin and ceramics) can be used as it is as the resonance absorption plate layer. Further, the back-lined portion of the mat layer 5 can be formed substantially in a plate-like shape at a high density and used as the resonance absorption plate layer 24.

Further, if the weight of the resonance absorption plate layer 24 is increased excessively, it is not undesirable since the rubber blend as the porous soundproof layer-forming material is not foamed sufficiently or sagging may be caused in the porous soundproof layer 23.

(d) Preparation of Vibration Damping Soundproof Sheet

Blend components for (a) vibration damping layer-forming material 7, (b) soundproof layer-forming material 8 and (c) resonance absorption plate layer described above are usually kneaded in a kneader, Banbury mixer or the like, roll-distributed or extruded into a vibration damping layer forming material 7 (usually from 0.2 to 5 mm), soundproof layer-forming material 8 (usually from 1 to 5 mm) and resonance absorption plate layer-forming material 9 (usually from 0.5 to 3 mm) each in a sheet-like shape. Then, each of the forming materials is appended to laminate to form a vibration damping soundproof sheet according to this invention (FIG. 7). The bonding operation is conducted for each of the molded materials prepared separately as elongate material, cutting them into a predetermined size respectively and laminating them, or conducted simultaneously after roll-distribution or extrusion.

In the case of using a metal or like other plate material or the portion of the mat layer back-lined to a high density as the resonance absorption plate layer 24, the vibration damping layer-forming material 7 and the soundproof layer-forming material 8 are formed in the same manner as above and then appended to laminate. Then, the plate material and the mat layer are molded into a predetermined shape such that they can be bonded to the porous soundproof layer.

(e) Application of Vibration Damping Soundproof Sheet

In the case where the vibration damping soundproof sheet thus obtained is in a three-layered laminate comprising the vibration damping layer-forming material 7, the soundproof layer-forming material 8 and the resonance absorption plate layer forming material 9, such a vibration damping soundproof sheet is set to the panel surface 1 of a vehicle and passed through the inside of a drying furnace (heating temperature is usually at 140°-160° C.). The vibration damping layer-forming material 7 is heated to soften and fitted by its own weight to the panel surface 1 of the vehicle to form a vibration damping layer 12. The soundproof layer-forming material 8 is foamed to form a porous soundproof layer 23. In this case, when the rubber polymer ingredient for the soundproof layer forming material 8 comprises from 15 to 85% by weight of 1,2-polybutadiene and the balance of the rubber ingredient, the soundproof layer-forming material 8 develops a slight flowing property to render the interface with the resonance absorption plate layer 24 flat as shown in FIG. 8 upon heating.

Also the resonance absorption plate layer-forming material 9 forms the resonance absorption plate layer 24 by the heating described above.

In the case of using a metal or like other plate material or the portion of the mat layer back-lined at a high density as the resonance absorption plate layer 24, a laminate of the vibration damping layer-forming material 7 and the soundproof layer-forming material 8 is previously set to the panel surface 1 of a vehicle and heated in the same manner as described above to form the vibration damping layer 12 and the porous soundproof layer 23. Then, the plate material and the mat layer are bonded onto the porous soundproof layer 23.

EXAMPLE (1) The vibration damping-layer forming material 7 was formed by kneading the rubber type adhesive blend of the following composition in a kneader and then molding to 1 mm thickness.

| Rubber type adhesive blend | (Unit:part by weight) |
|---|---|
| Straight asphalt (80/100) | 30 |
| Blown asphalt (10/20) | 40 |
| Regenerated SBR | 30 |
| Petroleum resin (softening point: 100° C.) | 10 |
| Process oil | 5 |
| Talc | 100 |
| Mica | 10 |

| -continued | |
|---|---|
| Rubber type adhesive blend | (Unit:part by weight) |
| Asbesto | 30 |

(2) The same material as the vibration damping soundproof sheet for use in vehicle shown in FIG. 2 is used as the soundproof layer-forming material 8.

(3) The resonance absorption plate layer-forming material 9 was formed by kneading the rubber type blends (a–c) shown in FIG. 5 in a kneader and then extruding them to a 2 mm thickness.

The forming materials for the each of the layers thus obtained were bonded to laminate to obtain vibration damping soundproof sheets of each of the examples (13–15) shown in Table 6.

In the case where the resonance absorption plate layer-forming material 9 is resin type blends (d, e in Table 5), they were coated (in the case of liquid state) or scattered (in the case of powder) to the soundproof layer-forming material 8 molded previously and applied with heat treatment into a semi-hardened state to form the vibration damping soundproof sheets of each of the Examples 16, 17. The thickness was 2 mm.

In the case of f (steel plate) in Table 5, the vibration damping layer-forming material 7 and the soundproof layer-forming material 8 as described above were appended, set to the panel surface 1 of a vehicle, heated to form the vibration damping layer 12 and the porous soundproof layer 23 respectively and then the resonance absorption plate layer 24 made of a steel plate of 0.8 mm thickness was appended to the porous soundproof layer 23 to form a vibration damping soundproof sheet in Example 18.

(4) For each of the examples as described above, test was carried out for each of the items shown below.

TEST ITEM

Test items include (1) foaming ratio of soundproof layer, (3) water absorption of the soundproof layer, (4) sound barrier property, (5) vibration damping property, (6) fitness and surface flatness. The test was the same as that for the vibration damping soundproof sheet for use in vehicle as described above.

TABLE 5

|  | a<br>Bituminous rubber<br>type material | b<br>Rubber<br>material | c<br>Rubber<br>material | d<br>Resin<br>material | e<br>Resin<br>material | f<br>Iron<br>plate |
|---|---|---|---|---|---|---|
| SBR | (Same as | | 100 | | | (SPCC cold - |
| IIR | the vibration | 100 | | | | rolled steel |
| Petroleum resin (softening point: 80° C.) | damping layer blend) | 30 | 30 | | | plate) |
| Petroleum resin (softening point: 100° C.) | | 20 | 20 | | | |
| Paraffinic process oil | | 20 | | | | |
| DOP | | 20 | | 60 | 60 | |
| calcium carbonate | | 200 | 150 | 50 | 100 | |
| Aromatic process oil | | | 20 | | | |
| Stearic acid | | | 1 | | | |
| Zinc powder | | | 5 | | | |
| Sulfur | | | 2 | | | |
| Vulcanization acceleator | | | 1.5 | | | |
| Carbon black | | | 50 | | | |
| Polyvinyl chloride | | | | 100 | 80 | |
| Stabilizer | | | | 5 | 5 | |
| EVA | | | | | 20 | |

Thickness for the resonance absorption plate layers a–e was 2 mm.
Thickness for the resonance absorption plate layer f was 0.8 mm.

TABLE 6

|  | Example | | | | | | Comparative Example | | | | |
|---|---|---|---|---|---|---|---|---|---|---|---|
|  | 13 | 14 | 15 | 16 | 17 | 18 | 9 | 10 | 11 | 12 | 13 |
| Resonance absorption plate layer (thickness: mm) | a (2) | b (2) | c (2) | d (2) | e (2) | f (0.8) | no resonance absorption plate layer | | | | |
| Thickness of porous soundproof layer (mm) | 10 | 10 | 10 | 10 | 10 | 10 | 10 | 10 | 15 | 20 | 20 |
| Thickness of vibration damping layer (mm) | 1 | 1 | 1 | 1 | 1 | 1 | 2 | 5 | 2 | 2 | 5 |
| Sound-barrier property (dB) | | | | | | | | | | | |
| 500 Hz | 34 | 34 | 35 | 33 | 34 | 35 | 30 | 33 | 30 | 30 | 33 |
| 1 kHz | 58 | 57 | 59 | 57 | 58 | 59 | 52 | 55 | 52 | 53 | 56 |
| 2 kHz | 66 | 65 | 67 | 65 | 66 | 67 | 59 | 63 | 59 | 59 | 63 |
| 3.15 kHz | 71 | 71 | 72 | 70 | 70 | 71 | 64 | 68 | 65 | 65 | 69 |
| 4 kHz | 76 | 75 | 75 | 75 | 75 | 75 | 70 | 73 | 70 | 71 | 74 |
| 5 kHz | 79 | 78 | 77 | 78 | 78 | 77 | 73 | 75 | 74 | 74 | 76 |
| 8 kHz | 82 | 83 | 80 | 83 | 82 | 81 | 76 | 79 | 76 | 77 | 80 |
| Vibration damping property | | | | | | | | | | | |
| (20° C.) | 0.32 | 0.29 | 0.29 | 0.27 | 0.27 | 0.30 | 0.26 | 0.27 | 0.26 | 0.26 | 0.28 |
| Fitness Surface fitness | | | | | | | | | | | |
| Foaming ratio | 6 | 6 | 5.9 | 6 | 6 | 5.8 | 6 | 6 | 6 | 6 | 6 |

From the result of Table 6, it can be seen that the vibration damping soundproof sheet for use in vehicle according to this invention can provide a comparable soundproofing effect with a sheet thickness substantially one-half of the sheet with no resonance absorption plate layer.

What is claimed is:

1. Vibration damping soundproof sheet for use in vehicles comprising:
    (A) a vibration damping layer-forming material comprising a rubber type adhesive blend, in which a tackifier, an inorganic filler, a fiberous filler and a softening agent was blended to a matrix comprising a rubber ingredient and a bituminous ingredient, and
    (B) a soundproof layer-forming material comprising a foamed rubber blend to be bonded to form on said vibration damping layer forming material, in which a foaming agent and other rubber blending agents are blended to a rubber type polymer containing from 15 to 85% by weight of 1,2-polybutadiene ingredient.

2. A vibration damping soundproof sheet for use in vehicles comprising:
    (A) a vibration damping layer-forming material comprising a rubber type adhesive blend, in which a tackifier, an inorganic filler, a fiberous filler, a softening agent and a thermosetting resin capable of co-crosslinking with a rubber ingredient is blended to a matrix comprising said rubber ingredient and a bituminous ingredient, and
    (B) a soundproof layer forming-material composing a foamed rubber blend to be bonded to form on said vibration damping layer-forming material, in which a foaming agent and other rubber blending agents are blended to a rubber type polymer containing from 15 to 85% by weight of a 1,2-polybutadiene ingredient.

3. A vibration damping soundproof sheet for use vehicles comprising:
    (A) a vibration damping layer forming material comprising a rubber type adhesive blend in which a tackifier, an inorganic filler, a fiberous filler and a softening agent are blended to a matrix comprising a rubber ingredient and a bituminous ingredient,
    (B) a retainer layer-forming material to be bonded to form on said vibration damping layer forming material comprising a thermosetting resin capable of co-crosslinking with the rubber ingredient in said vibration damping layer-forming material, and
    (C) a vibration proof layer forming material composing a foamed rubber blend to be bonded to form on said retainer layer-forming material, in which a foaming agent and other rubber blending agents are blended to a rubber type polymer containing from 15 to 85% by weight of 1,2-polybutadiene ingredient.

4. A vibration damping soundproof sheet for use in vehicles as defined in claim 1, wherein an inorganic filler and a fiberous filler are blended with the thermosetting resin of the retainer layer-forming material.

5. A vibration damping soundproof sheet for use in vehicles as defined in claim 3, wherein a bituminous ingredient is blended with the thermosetting resin of the retainer layer-forming material.

6. A vibration damping soundproof sheet for use in vehicles as defined in claim 3, wherein a rubber ingredient capable of co-crosslinking with the curing resin of the retainer layer-forming and the rubber ingredient of the vibration damping layer forming material, a tackifier, an inorganic filler, a fiberous filler and a softening agent are blended to the thermosetting resin of the retainer layer-forming material.

7. A vibration forming soundproof sheet for use in vehicles as defined in claim 3, wherein a rubber ingredient capable of co-crosslinking with the curing resin of the retainer layer-forming material and the rubber ingredient of the vibration damping layer forming material, a tackifier, an inorganic filler, a fiberous filler, a softening agent and a bituminous ingredient are blended to the thermosetting resin of the retainer layer forming material.

8. A vibration damping soundproof sheet for use in vehicles comprising:
    (A) a vibration damping layer-forming material comprising a rubber type adhesive blend, in which a tackifier, an inorganic filler, a fiberous filler, a softening agent and a thermosetting resin capable of co-crosslinking with a rubber ingredient are blended to a matrix comprising said rubber ingredient and a bituminous ingredient, (B) a retainer layer-forming material to be bonded to form onto said vibration damping layer forming material comprising a thermosetting resin capable of co-crosslinking with the rubber ingredient of said vibration damping layer-forming material, and (C) a soundproof layer-forming material comprising a foamed rubber blend to be bonded to form onto said retainer layer-forming material, in which a forming agent and other rubber blending agents are blended to a rubber type polymer containing from 15 to 85% by weight of 1,2-polybutadiene ingredient.

9. A vibration damping soundproof sheet for use in vehicles comprising:

(A) a vibration damping layer prepared by vulcanizing a rubber type adhesive blend, in which a tackifier, an inorganic filler, a fibrous filler and a softening agent are blended to a matrix comprising a rubber ingredient and a bituminous ingredient, (B) a soundproof layer to be formed onto said vibration damping layer prepared by vulcanizing a foamed rubber blend and having an open cell structure, in which a foaming agent and other rubber blending agents are blended to a rubber type polymer containing from 15 to 85% by weight of 1,2-polybutadiene ingredient, and (C) a resonance absorption plate layer made of material to be formed on said soundproof layer and having a higher density than said soundproof layer.

10. A vibration damping soundproof sheet for use in vehicles as defined in claim 9, wherein the resonance absorption plate layer comprises the same material as that of the vibration damping layer.

11. A vibration damping layer soundproof sheet for use in vehicles as defined in claim 9, wherein the resonance absorption plate layer comprises a rubber type polymer.

12. A vibration damping soundproof sheet for use in vehicles as defined in claim 9, wherein the resonance absorption plate layer comprises a resin type polymer.

13. A vibration damping soundproof sheet for use in vehicles as defined in claim 9, wherein the resonance absorption plate layer comprises a metal plate.

* * * * *